United States Patent
Hamaguchi

(10) Patent No.: US 10,719,226 B2
(45) Date of Patent: Jul. 21, 2020

(54) TOUCH PANEL FOR MANUALLY OPERATING MACHINERY

(71) Applicant: Daifuku Co., Ltd., Osaka OT (JP)

(72) Inventor: Jun Hamaguchi, Shiga (JP)

(73) Assignee: Daifuku Co., Ltd. (JP)

( * ) Notice: Subject to any disclaimer, the term of this patent is extended or adjusted under 35 U.S.C. 154(b) by 215 days.

(21) Appl. No.: 15/809,722

(22) Filed: Nov. 10, 2017

(65) Prior Publication Data
US 2018/0107375 A1 Apr. 19, 2018

Related U.S. Application Data

(63) Continuation of application No. PCT/JP2016/057115, filed on Mar. 8, 2016.

(30) Foreign Application Priority Data

Jun. 5, 2015 (JP) .................................. 2015-114446

(51) Int. Cl.
*G06F 3/0488* (2013.01)
*G05B 19/409* (2006.01)
(Continued)

(52) U.S. Cl.
CPC ......... *G06F 3/04883* (2013.01); *B65G 9/006* (2013.01); *B65G 43/08* (2013.01);
(Continued)

(58) Field of Classification Search
CPC .. G06F 3/04883; G06F 3/0484; G06F 3/0481; G06F 3/0488; G06F 3/04817; G06F 3/0482; G06F 3/04845; G06F 3/0487; G06F 3/0486; G06F 3/04886; G05B 19/409; G05B 15/02; G05B 19/106; G05B 19/108; G05B 23/0216; G05B 23/0272; G05B 2219/23257; G05B 2219/23258; G05B 2219/25067; G05B 2219/32128; B65G 43/08; B65G 9/006
See application file for complete search history.

(56) References Cited

U.S. PATENT DOCUMENTS 6,825,861 B2 * 11/2004 Wasko ............... G06F 3/04817 715/835
9,230,355 B1 * 1/2016 Ahuja ................ G06F 3/04817
(Continued)

FOREIGN PATENT DOCUMENTS

JP 2013232062 A 11/2013

*Primary Examiner* — Kieu D Vu
*Assistant Examiner* — Blaine T. Basom
(74) *Attorney, Agent, or Firm* — St. Onge Steward Johnston & Reens LLC

(57) ABSTRACT

A touch panel of a portable operation panel for manually operating machinery normally operated automatically, in particular, various types of material handling equipment operated in an emergency, machinery has an operation screen for making the machinery perform a specific operation. A swipe operation button image can be moved on to the operation screen by a swipe operation and a continuation operation button image is displayed in a place from which the swipe operation button image is moved. By performing a tap operation on the continuation operation button image, the machinery is made to perform the specific operation.

3 Claims, 7 Drawing Sheets

(51) Int. Cl.
*G06F 3/0481* (2013.01)
*G06F 3/0484* (2013.01)
*B65G 9/00* (2006.01)
*B65G 43/08* (2006.01)
*G05B 15/02* (2006.01)

(52) U.S. Cl.
CPC ........... *G05B 15/02* (2013.01); *G05B 19/409* (2013.01); *G06F 3/0481* (2013.01); *G06F 3/0484* (2013.01); *G06F 3/0488* (2013.01); *G06F 3/04817* (2013.01)

(56) References Cited

U.S. PATENT DOCUMENTS

| | | | |
|---|---|---|---|
| 9,990,105 B2* | 6/2018 | D'Argenio | G06F 3/0482 |
| 2009/0241072 A1* | 9/2009 | Chaudhri | G06F 3/04883 |
| | | | 715/863 |
| 2010/0207894 A1* | 8/2010 | Tsuei | G06F 3/04886 |
| | | | 345/173 |
| 2014/0149903 A1* | 5/2014 | Ahn | G06F 3/0488 |
| | | | 715/765 |
| 2015/0086667 A1* | 3/2015 | Grimm | B29C 45/76 |
| | | | 425/162 |
| 2015/0133199 A1* | 5/2015 | Lee | G06Q 30/0241 |
| | | | 455/566 |
| 2015/0331399 A1* | 11/2015 | Hackl | B29C 45/76 |
| | | | 700/83 |
| 2016/0209969 A1* | 7/2016 | Lancaster | G06F 3/0412 |
| 2016/0266758 A1* | 9/2016 | Li | G06F 3/0482 |
| 2017/0248946 A1* | 8/2017 | Ogura | A01B 69/00 |

\* cited by examiner

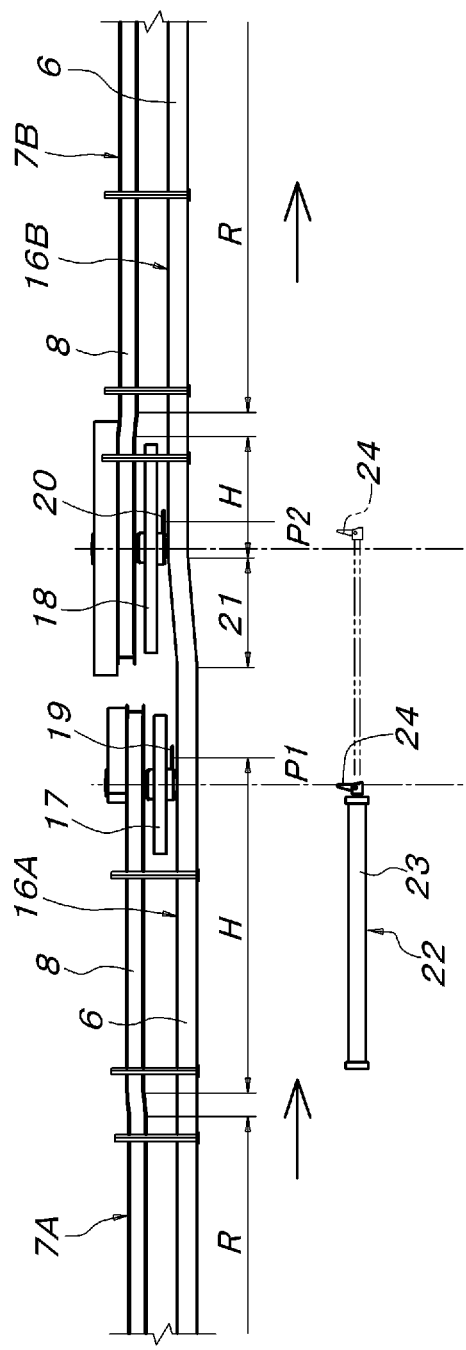
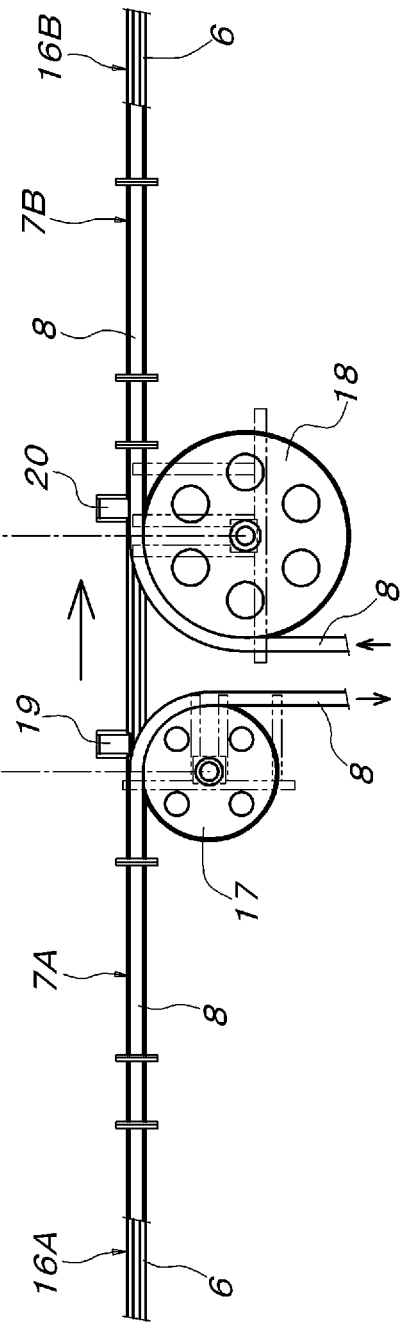
FIG. 1A
FIG. 1B

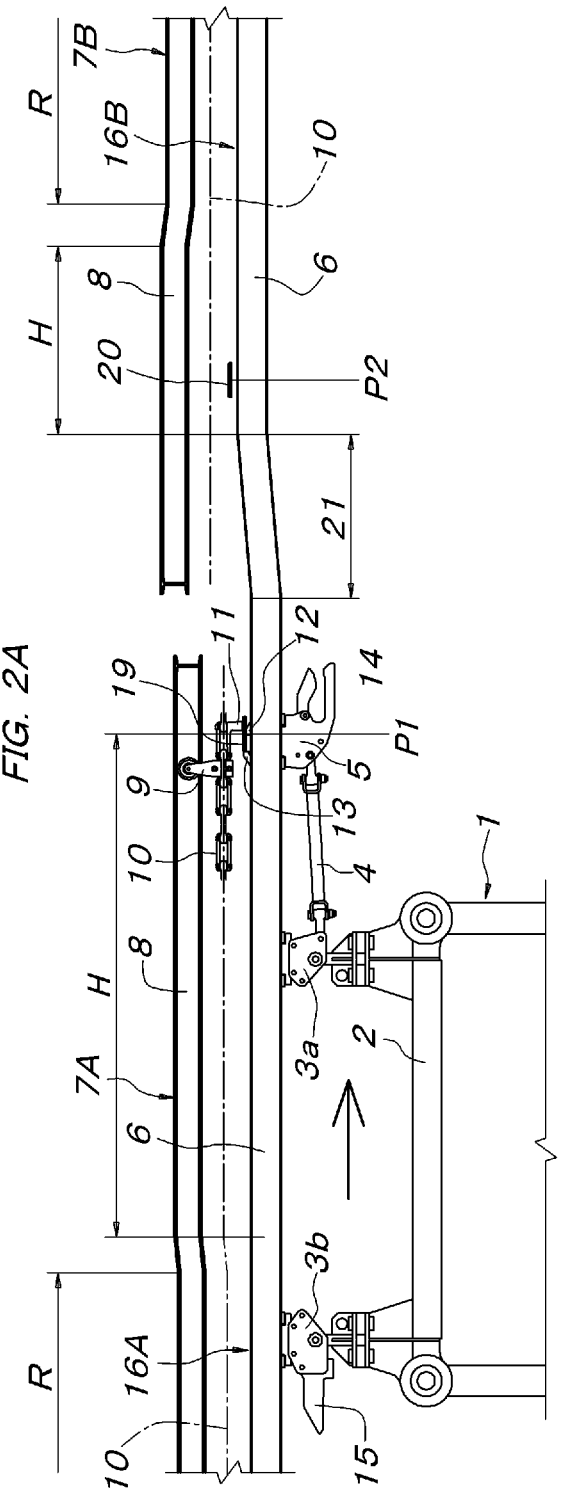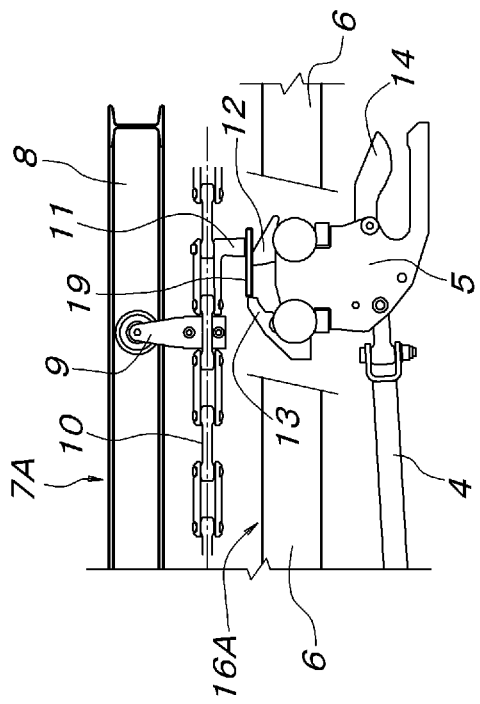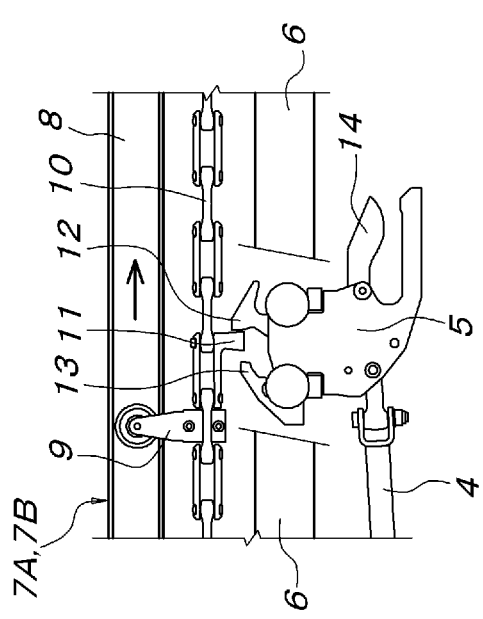

TOUCH PANEL FOR MANUALLY OPERATING MACHINERY

TECHNICAL FIELD

The present invention relates to a touch panel of a portable control panel which is utilized in a case where various types of machinery that are normally automatically operated, in particular, various types of machinery that belong to the field of material handling are manually operated in an emergency.

BACKGROUND ART

It has been considered that, as an operation panel for manually operating machinery, an operation panel is utilized which is generally called a tablet such as a handheld terminal or a notebook personal computer and which includes a touch panel where a tap operation can be performed on a screen. Although a patent literature which discloses a preferred conventional example for this touch panel for manually operating the machinery cannot be provided, it can be considered that in its generally conceivable configuration, on windows displayed on the screen in the individual stages of the manual operation, various types of information for an operator such as the details of an intended operation to be performed and a precondition for safely performing the operation are displayed, and a continuation operation button image for performing the operation, a stop operation button image for a case where inconvenience occurs if the operation is performed while maintaining the current conditions and the like are displayed. In any case, in order for the properties of the touch panel to be utilized, an operation for the continuation operation button image, the stop operation button image or the like is a tap operation which is performed with a fingertip of the operator.

SUMMARY OF INVENTION

Since in the touch panel considered to be used as described above, only by taping an intended operation button image, an operation associated with the operation button image can be performed, as compared with, for example, a general personal computer operation in which a click operation needs to be performed in a state where the cursor of a mouse or a touchpad is overlaid on the intended operation button image, it is possible to extremely swiftly and easily perform the intended operation. However, there is a possibility that this property works negatively such that the operation button image is unintentionally touched and the operation associated with the operation button image is performed with unintentional timing. In particular, since machinery is manually operated, in a case where the operation is performed with unintentional timing, it may lead to large-scale damage in the machinery or an accident causing injury or death.

The present invention proposes a touch panel for manually operating machinery which can solve the conventional problem as described above, and for ease of understanding of a relationship with an embodiment which will be described later, the touch panel for manually operating machinery according to the present invention will be shown with reference signs which are used in the description of the embodiment and which are placed in parentheses. It is configured such that, in a touch panel of a portable operation panel for manually operating machinery, on an operation screen for making the machinery perform a specific operation, a movable screen portion (swipe operation button image (32)) that can be moved on the screen by a swipe operation and an operation button image (continuation operation button image (33)) that is displayed in a place from which the movable screen portion (swipe operation button image (32)) is moved when the movable screen portion is moved are provided, and, by performing a tap operation on the operation button image (continuation operation button image (33)) after the swipe operation on the movable screen portion (swipe operation button image (32)), the machinery is made to perform the specific operation.

In the configuration of the present invention described above, since the operation button image on which the tap operation is performed in order to make the machinery perform the specific operation is not displayed without the movable screen portion being moved by the swipe operation, even when any place on the operation screen is touched before the swipe operation on the movable screen portion, the machinery is completely prevented from being unintentionally made to perform the specific operation. Moreover, the fact that it is necessary to perform the swipe operation on the movable screen portion before making the specific operation perform means that a time for determining whether or not the specific operation is made to perform is also provided, with the result that the manual operation for making the machinery perform the specific operation can be safely performed with sufficient margin.

When the present invention is implemented, although the movable screen portion is preferably formed with a dedicated swipe operation button image in which the direction of the swipe operation is displayed, the swipe operation button image is made to also serve as a stop operation button image for stopping the performance of the specific operation on the machinery, and when the tap operation is performed on the stop operation button image, the performance of the specific operation on the machinery is stopped whereas the swipe operation is performed on the stop operation button image in a predetermined direction, the operation button image for making the machinery perform the specific operation can be made to appear as expected. With this configuration, the number of button images which need to be displayed on the operation screen is reduced, and thus it is possible to achieve a simple screen configuration. Moreover, even when the tap operation is erroneously performed instead of the swipe operation, a stoppage of the performance of the specific operation on the machinery merely results, and thus there is no risk that another operation is unintentionally performed. It is noted that, in a case where this configuration is implemented, it is preferably simply configured such that the stop operation button image also serving as the swipe operation button image is displayed as if apparently being the stop operation button, and an arrow indicating the direction of the swipe is additionally displayed on this image.

In addition, since on the operation screen of the touch panel, in each stage of the manual operation, a window for displaying information to be displayed related to the then-intended manual operation to the operator is displayed, it is possible to configure the window such that the window is moved on the screen by the swipe operation, the window is made to serve as the movable screen portion, and thus the operation button image is displayed in a small window displayed in a place from which the window is moved when the window is moved by the swipe operation. In this case, in the window, a display (such as an arrow) indicating the direction of the swipe operation is displayed. As described above, the window itself which is originally needed is made to also serve as the swipe operation target in which the direction of the swipe operation is displayed, and thus it is possible to simply configure the operation screen.

Furthermore, by configuring such that, when the tap operation is not performed on the operation button image within a set time after the swipe operation on the movable screen portion, the movable screen portion is automatically returned such that the operation button image is hidden, and thus the operation button image is prevented from being carelessly kept displayed for a long period of time, it is possible to further enhance safety.

BRIEF DESCRIPTION OF DRAWINGS

FIGS. 1A and 1B show a power and free type trolley conveyor as an example of machinery according to the present invention, FIG. 1A is a side view illustrating the configuration of the transition location of a conveying traveling body from an upstream travel path portion to a downstream travel path portion and FIG. 1B is a plan view of FIG. 1A.

FIG. 2A is a side view illustrating a state where the conveying traveling body is stopped in the fixed stop position of the terminal end of the upstream travel path portion, and FIG. 2B is a partially cutaway enlarged view of a main portion of FIG. 2A, and FIG. 2C is a partially cutaway enlarged side view of the main portion showing a state where the conveying traveling body is driven in the travel path portion.

DESCRIPTION OF EMBODIMENTS

Figure 3A:
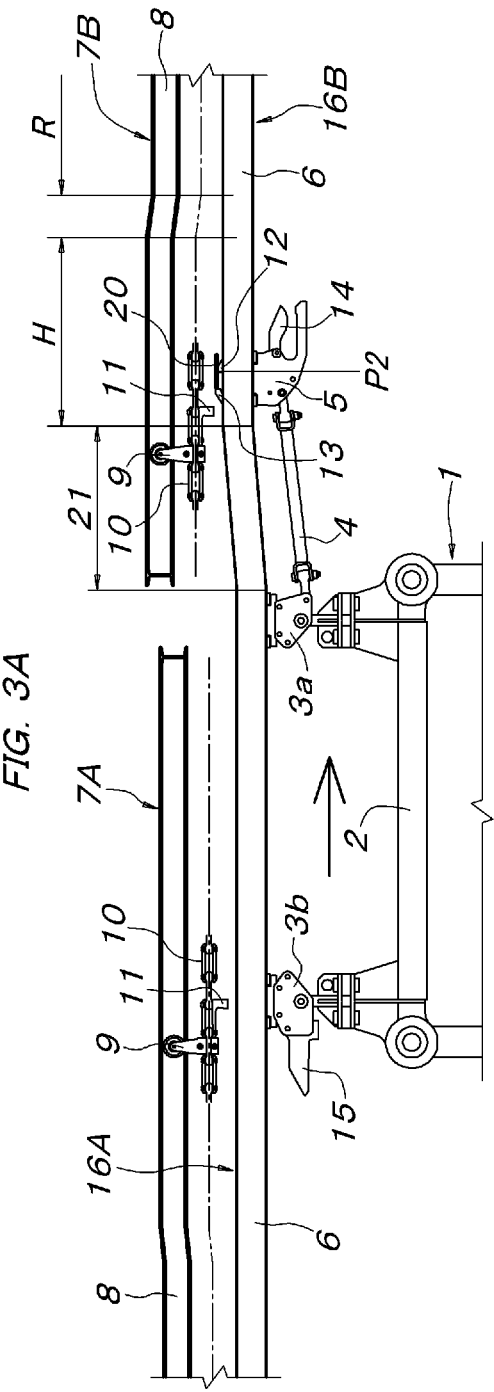
FIG. 3A is a side view illustrating a state where the conveying traveling body is stopped in the fixed stop position of the beginning end of the downstream travel path portion.

As an example of machinery to which the present invention is applied, a power and free type trolley conveyor will first be described with reference to FIGS. 1 to 3. Reference sign 1 denotes a conveying traveling body, and the conveying traveling body 1 includes two front and rear load trolleys 3a and 3b which suspend both front and rear end portions of a hanger-type main body portion 2 for supporting a conveyed object, and a driven trolley 5 which is coupled to the front of the front load trolley 3a via a coupling bar 4. The travel path of the conveying traveling body 1 is formed with a guide rail 6 which supports the load trolleys 3a and 3b and the driven trolley 5 such that they are freely moved. Reference signs 7A and 7B denote drive means for the conveying traveling body 1, and the drive means are formed with a guide rail 8 which is laid on the upper side of the guide rail 6 along the guide rail 6 of the conveying traveling body 1, a drive chain 10 which is suspended by the guide rail 8 via trolleys 9, and pushers 11 which are provided so as to protrude downward from the drive chain 10 in the vicinity of the trolleys 9 at positions with appropriate intervals in the length direction of the drive chain 10. As conventionally known, the drive chain 10 turns along a circulation path including a path part along the travel path (the guide rail 6) of the conveying traveling body 1, and is driven at a predetermined speed with motor-driven sprocket wheels which are provided at appropriate locations in the circulation path.

In the driven trolley 5 of the conveying traveling body 1, a driven dog 12 which is freely raised and lowered, a check dog 13 which is located at the rear of the driven dog 12, and an operated piece 14 which is protruded forward from the driven trolley 5 and which is freely swung vertically are provided. The driven dog 12 and the operated piece 14 are configured so as to be interlocked and coupled to each other such that the driven dog 12 is interlocked with the upward movement of the operated piece 14 so as to be lowered from the upward movement limit position, and the driven dog 12 is biased by gravity acting on the operated piece 14 so as to be held at the upward movement limit position. In the rear load trolley 3b of the conveying traveling body 1, an operating piece 15 for lowering, when the conveying traveling bodies 1 are moved close to each other, the driven dog 12 of the driven trolley 5 in the conveying traveling body 1 on the rear side by moving upward the operated piece 14 of the driven trolley 5 in the conveying traveling body 1 on the rear side is provided so as to protrude backward.

The check dog 13 is pivotally supported so as to freely fall down forward and downward, and is biased and held by gravity so as to have a standing posture. The check dog 13 in the standing posture is configured so as to be one-stage lower than the upper end of the driven dog 12 in the upward movement limit position. Then, in a drive path part where the conveying traveling body 1 is propelled with the drive means 7A and 7B, a distance in an up/down direction between the guide rail 6 for guiding the conveying traveling body 1 (the trolleys 3a, 3b, and 5) and the guide rail 8 for guiding the pusher 11 (the drive chain 10) is set to a standard distance such that the pusher 11 which is moved to approach from the rear of the conveying traveling body 1 makes the check dog 13 fall down forward and downward, makes contact with and pushes the upper end portion of the driven dog 12 in the upward movement limit position from the rear immediately after passing through the position of the check dog 13, and makes the driven trolley 5 and hence the conveying traveling body 1 travel to advance via the driven dog 12. When the pusher 11 drives the conveying traveling body 1, the check dog 13 is returned to the standing posture so as to be located on the rear side of the pusher 11, and thus the check dog 13 makes contact with the pusher 11 so as to prevent the driven trolley 5 of the conveying traveling body 1 from being moved ahead of the pusher 11.

As shown in FIG. 1A, the travel path of the conveying traveling body 1 is sectioned into an upstream travel path 16A in which the conveying traveling body 1 is driven by the upstream drive means 7A so as to travel and a downstream travel path 16B in which the conveying traveling body 1 is driven by the downstream drive means 7B so as to travel. In the connection location of the upstream travel path 16A and the downstream travel path 16B, a guide sprocket wheel 17 which retracts the drive chain 10 of the upstream drive means 7A laterally from the upstream travel path 16A and a guide sprocket wheel 18 which guides the drive chain 10 of the downstream drive means 7B onto the downstream travel path 16B are pivotally supported. In addition, in a terminal end portion of the upstream travel path 16A and a beginning end portion of the downstream travel path 16B, fixed stop positions P1 and P2 are set, and in the respective fixed stop positions P1 and P2, stoppers 19 and 20 for stopping the conveying traveling body 1 in the respective fixed stop positions P1 and P2 and which are freely advanceable and retractable are provided.

In the terminal end portion of the upstream travel path 16A and the beginning end portion of the downstream travel path 16B, wide distance regions H are provided in which the distance in the up/down direction between the guide rail 6 for guiding the conveying traveling body 1 and the guide rail 8 for guiding the pusher 11 is wider than the standard distance shown in FIG. 2C, the stopper 19 in the fixed stop position P1 of the terminal end portion of the upstream travel path 16A is provided in the terminal end portion of the wide distance region H in the terminal end portion of the upstream travel path 16A and the stopper 20 in the fixed stop position P2 of the beginning end portion of the downstream travel path 16B is provided in a position close to the beginning end of the wide distance region H in the beginning end portion of the downstream travel path 16B.

The respective stoppers 19 and 20 are driven by an actuator such as a solenoid or a cylinder unit so as to be advanceable and retractable in a perpendicularly horizontal direction with respect to the movement path of the driven dog 12 in the driven trolley 5 of the conveying traveling body 1, and it is configured such that, when the respective stoppers 19 and 20 are located in action positions advanced into the movement path of the driven dog 12, the driven dog 12 is pushed down by utilization of the front inclination surface of the driven dog 12 as the driven trolley 5 of the driven dog 12 is moved to advance, the driven dog 12 is released downward from the pusher 11 having been pushing the driven dog 12 from the rear, and thereafter the stoppers 19 and 20 make contact with the upper end portion of the check dog 13 so as to receive the driven trolley 5 (the conveying traveling body 1). When the stoppers 19 and 20 stop the driven trolleys 5 in the fixed stop positions P1 and P2, the upper surface of the stoppers 19 and 20 and the upper end of the check dog 13 in the standing posture are substantially on the same level, and thus the following pusher 11 can be moved to pass the upper side of the stoppers 19 and 20 and the check dog 13.

The regions on the further upstream side with respect to the wide distance region H in the upstream travel path 16A and on the further downstream side with respect to the wide distance region H in the downstream travel path 16B are standard distance regions R. In the standard distance region R, as shown in FIG. 2C, the distance in the up/down direction between the guide rail 6 for guiding the conveying traveling body 1 and the guide rail 8 for guiding the pusher 11 is a distance over which the pusher 11 is engaged between the driven dog 12 and the check dog 13 and over which in a state where the check dog 13 functions, the pusher 11 can drive the driven trolley 5 (the conveying traveling body 1). It is noted that, on the further upstream side with respect to the wide distance region H in the downstream travel path 16B, a rising gradient path portion 21 having an appropriate length is provided in the guide rail 6 for guiding the conveying traveling body 1.

As shown in FIG. 1A, a feeder 22 is additionally provided which sends the conveying traveling body 1 from the fixed stop position P1 in the terminal end portion of the upstream travel path 16A into the fixed stop position P2 in the beginning end portion of the downstream travel path 16B. The feeder 22 can be formed with, for example, a check pusher 24 which is driven to be pushed or drawn by a cylinder unit 23, and the feeder 22 pushes an appropriate portion of the conveying traveling body 1 from the rear and thereby can send the conveying traveling body 1 from the fixed stop position P1 into the fixed stop position P2. As a matter of course, the feeder 22 is not limited to a feeder which is formed with the cylinder unit 23 and the check pusher 24, but the feeder 22 may also be formed with a check pusher which is driven by a chain or a screw.

The trolley conveyor system configured as described above can be used as follows. That is, before the conveying traveling body 1 driven by the pusher 11 of the upstream drive means 7A in the upstream travel path 16A reaches the terminal end portion of the upstream travel path 16A, the stopper 19 in the fixed stop position P1 is made to advance to the action position. As a matter of course, the switching of the stopper 19 to the action position in this case is performed in a vacant state where another conveying traveling body 1 is not present within a transition area which includes the region of the terminal end portion of the upstream travel path 16A and the region of the beginning end portion of the downstream travel path 16B. Then, when the conveying traveling body 1 (see FIG. 2C) driven by the pusher 11 of the upstream drive means 7A reaches the terminal end portion of the upstream travel path 16A, as shown in FIGS. 2A and 2B, the driven dog 12 of the driven trolley 5 pushed by the pusher 11 from the rear is pushed down by the stopper 19, the pusher 11 is released from the driven dog 12 so as to pass as it is, and the stopper 19 makes contact with the check dog 13 so as to receive the driven trolley 5, with the result that the conveying traveling body 1 is automatically stopped in the fixed stop position P1. As shown in FIG. 1A, the check pusher 24 of the feeder 22 is located in a retract limit position, and the conveying traveling body 1 collapses the check pusher 24 so as to pass, and is then automatically stopped by the stopper 19 in the fixed stop position P1. At this time, the rear-pushed location of the conveying traveling body 1 which is pushed from the rear by the check pusher 24 is located directly in front of the check pusher 24 in the retract limit position. Also, in a state where the conveying traveling body 1 is stopped in the fixed stop position P1 by the stopper 19 so as to be placed on standby, since the fixed stop position P1 is within the wide distance region H, the following pusher 11 of the upstream drive means 7A can be moved to pass, without any problem, the top of the driven trolley 5 in the conveying traveling body 1 which is stopped in the fixed stop position P1 so as to be placed on standby.

Figure 3B:
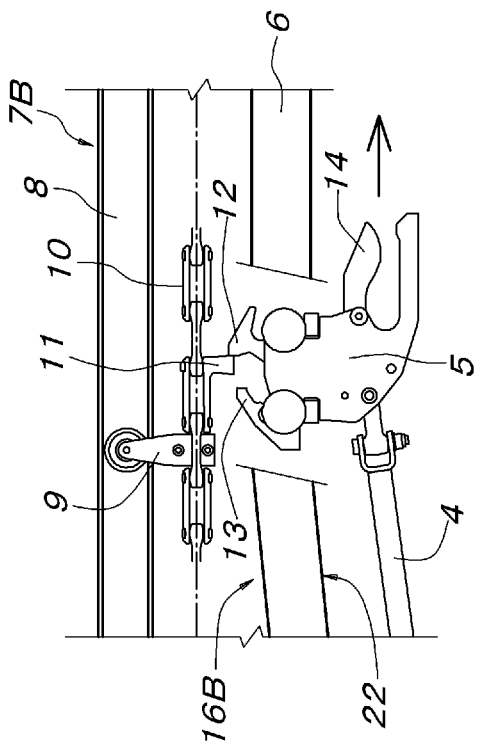
FIG. 3B is a partially cutaway enlarged view of a main portion of FIG. 3A.

Next, in a state where the stopper 20 in the fixed stop position P2 of the beginning end portion in the downstream travel path 16B is made to advance to the action position, the stopper 19 in the fixed stop position P1 is made to exit, the driven dog 12 is returned to the original upward movement limit position, thereafter the check pusher 24 of the feeder 22 is moved by the cylinder unit 23 so as to travel to advance to an advance limit position, the rear-pushed location of the conveying traveling body 1 which has been stopped in the fixed stop position P1 is thereby pushed by the check pusher 24 from the rear, and the conveying traveling body 1 is sent toward the beginning end portion of the downstream travel path 16B. By the sending action of the conveying traveling body 1 by the check pusher 24 of the feeder 22, as shown in FIGS. 3A and 3B, the driven dog 12 of the driven trolley 5 in the conveying traveling body 1 is pushed down by the stopper 20 in the fixed stop position P2, and the check dog 13 is received by the stopper 20, with the result that the conveying traveling body 1 is automatically stopped in the fixed stop position P2. At this time, the front load trolley 3a of the conveying traveling body 1 is stopped directly in front of the rising gradient path portion 21 of the guide rail 6. The sending of the conveying traveling body 1 into the fixed stop position P2 is performed at the timing at which a sufficient time can be ensured before the pusher 11 of the downstream drive means 7B additionally provided in the downstream travel path 16B reaches the fixed stop position P2.

Figure 3C:
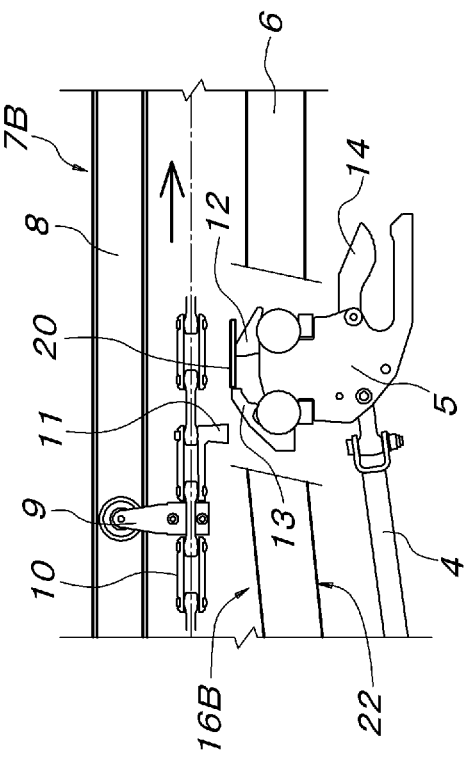
FIG. 3C is a partially cutaway enlarged view of the main portion illustrating a stage in which the driving of the conveying traveling body is started from the state of FIG. 3B.

As shown in FIGS. 3A and 3B, in a state where the conveying traveling body 1 is stopped in the fixed stop position P2 by the stopper 20 so as to be placed on standby, since the fixed stop position P2 is within the wide distance region H, the pusher 11 of the downstream drive means 7B can be moved to pass, without any problem, the top of the driven trolley 5 in the conveying traveling body 1 which is stopped in the fixed stop position P2 so as to be placed on standby. Then, before the pusher 11 which drives the conveying traveling body 1 stopped on standby in the fixed stop position P2 so as to make the conveying traveling body 1 travel reaches the fixed stop position P2, the stopper 20 in the fixed stop position P2 is made to exit, and thus the driven dog 12 is returned to the original upward movement limit position. Consequently, as shown in FIG. 3C, the pusher 11 of the downstream drive means 7B which is moved toward the fixed stop position P2 makes contact with the driven dog 12 of the driven trolley 5 so as to start the rear-pushing, and thus the driving of the conveying traveling body 1 stopped in the fixed stop position P2 is started.

As the conveying traveling body 1 travels along the downstream travel path 16B, the driven trolley 5 which is driven by being pushed from the rear with the pusher 11 of the downstream drive means 7B is moved from the wide distance region H where the fixed stop position P2 is present in the standard distance region R, and as shown in FIG. 2C, in a steady drive state where the pusher 11 is engaged between the driven dog 12 of the driven trolley 5 and the check dog 13, the conveying traveling body 1 is driven to travel.

Normally, as described above, the transition travel drive of the conveying traveling body 1 from the upstream travel path 16A to the downstream travel path 16B is automatically performed, however, there is a case where the above-described transition travel drive needs to be performed by a manual operation when a situation is brought about where the automatic operation cannot be performed for some reason or due to the confirmation of the operation, etc. For the manual operation in such a case, an operation panel is used which is portable and includes a touch panel for a tap operation such as a device that is generally called a tablet or a portable notebook personal computer.

Figure 4:
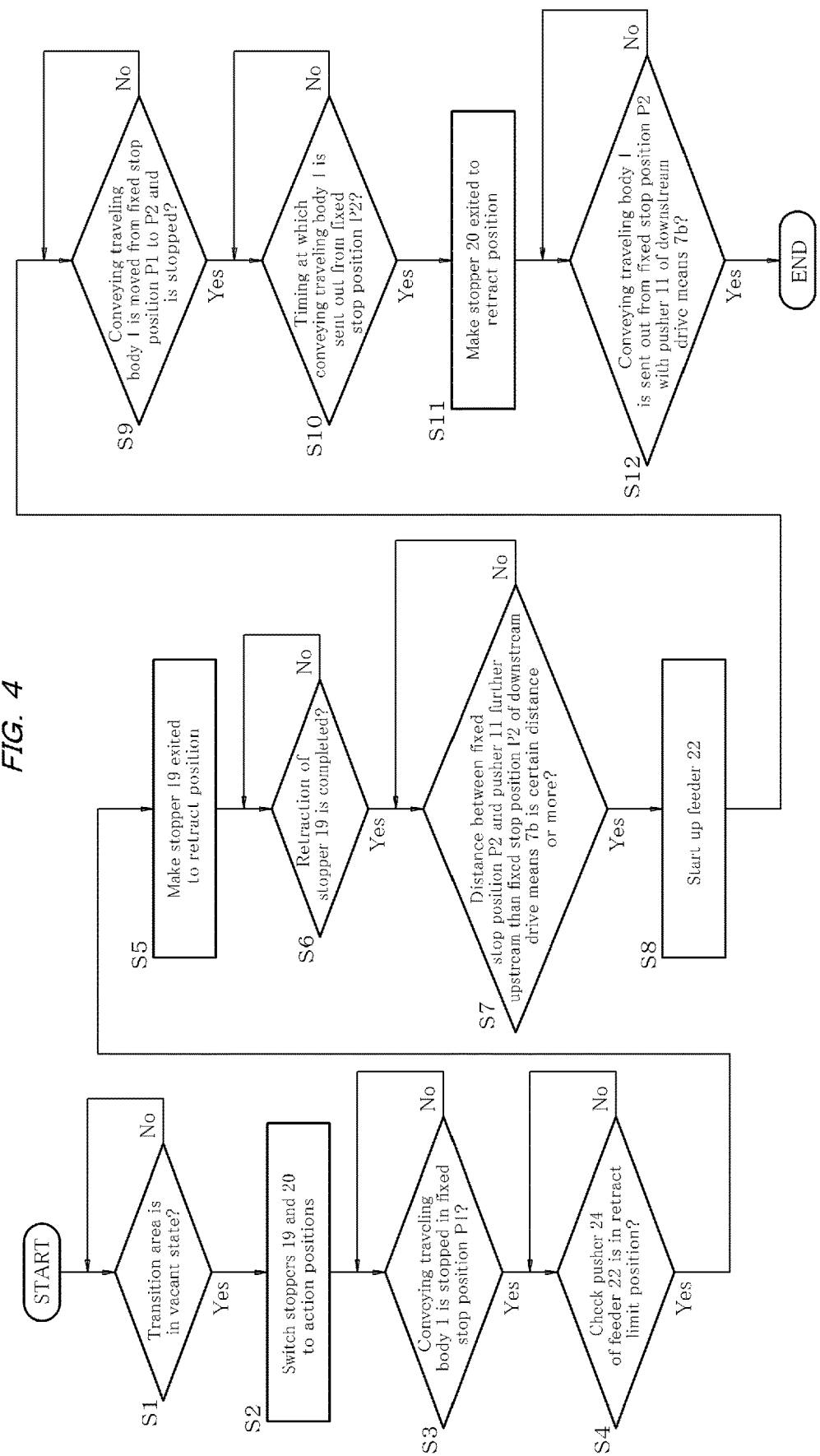
FIG. 4 is a flowchart showing the flow in a case where the transition control of the conveying traveling body in the above-mentioned trolley conveyer is performed by a manual operation.

The flow of the operation in a case where the above-described transition travel drive of the conveying traveling body 1 from the upstream travel path 16A to the downstream travel path 16B is performed by the manual operation on the operation panel is as shown in the flowchart of FIG. 4. Here, steps S2, S5, S8, and S11 are performed by an artificial operation on the touch panel of the operation panel. Before the respective performance steps S2, S5, S8, and S11 are performed, preceding confirmation steps, that is, a preceding confirmation step S1 for the performance step S2, preceding confirmation steps S3 and S4 for the performance step S5, preceding confirmation steps S6 and S7 for the performance step S8, preceding confirmation steps S9 and S10 for the performance step S11, and a confirmation step S12 for completing the transition travel drive control are performed by artificial confirmation actions.

Figure 5A:
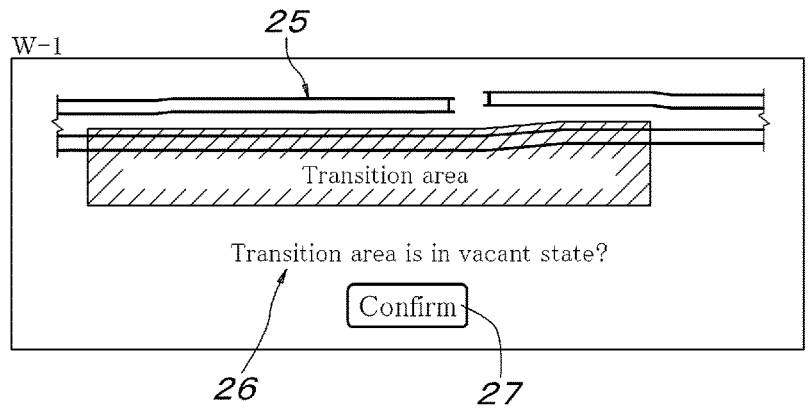
FIGS. 5A to 5C are illustrative diagrams showing a display screen in the first operation stage on the touch panel of an operation panel used in the manual operation.
Figure 5B:
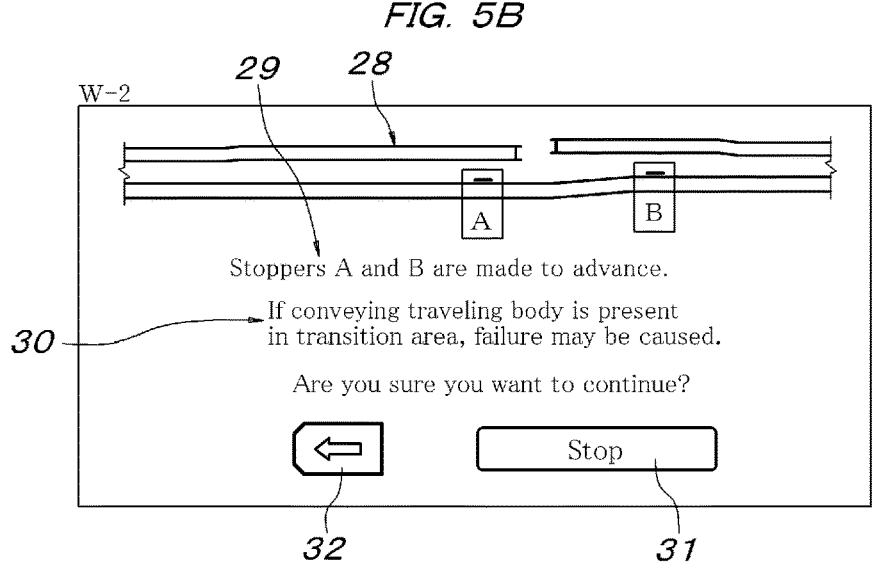
Figure 5C:
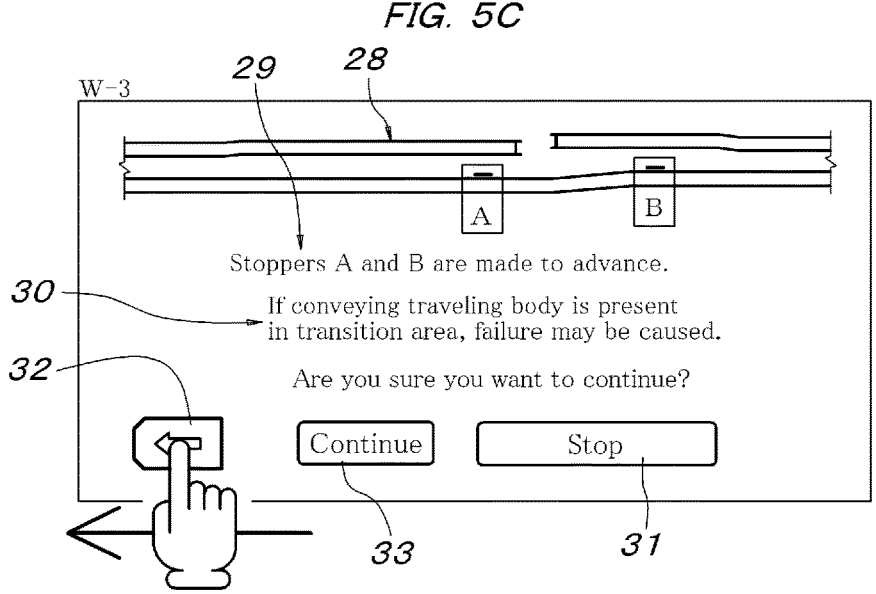

An operator who performs the transition travel drive of the conveying traveling body 1 from the upstream travel path 16A to the downstream travel path 16B by the manual operation carries the operation panel and moves to a place where the operator can visually recognize the transition area, that is, a transition area including the region of the terminal end portion of the upstream travel path 16A and the region of the beginning end portion of the downstream travel path 16B. Here, the operator confirms the conditions according to the flowchart shown in FIG. 4, and then performs the operation on the touch panel of the operation panel based on the confirmation. As an example, the display of the touch panel of the operation panel when the preceding confirmation step S1 and the performance step S2 are performed will be described with reference to FIG. 5. On the touch panel of the operation panel, a window W-1 (see FIG. 5A) for performing the preceding confirmation step S1 is displayed. In the window W-1, a transition area explanatory image 25, a confirmation item display statement 26, and a confirmation button image 27 are displayed, and the operator visually recognizes, with reference to the transition area explanatory image 25 and the confirmation item display statement 26, that the transition area is in a vacant state, and then performs the tap operation on the confirmation button image 27. Consequently, on the touch panel of the operation panel, instead of the window W-1, a window W-2 (see FIG. 5B) is displayed.

In the window W-2, a transition area explanatory image 28 including stoppers A and B corresponding to the stoppers 19 and 20 provided in the fixed stop positions P1 and P2, an operation detail display statement at the time of continuation 29, a warning statement before continuation 30, a stop operation button image 31, and a swipe operation button image before continuation 32 are displayed. Therefore, the operator can confirm the details of the subsequent operation from the operation detail display statement 29, and also confirm cautions from the warning statement before continuation 30, and, if the operator determines from the details of the warning statement before continuation 30 that inconvenience would occur when the operation is performed as it is, the operator can perform the tap operation on the stop operation button image 31, and thereby interrupt the manual operation for the transition travel drive control. When the operator determines that no problem would occur even if the operation is performed as it is, as shown in a window W-3 of FIG. 5C, the swipe operation is performed with a fingertip on the swipe operation button image 32 in an indicated direction. Consequently, since as shown in the same figure, in the position of the swipe operation button image 32 before the swipe operation, a continuation operation button image 33 appears, by performing the tap operation on the continuation operation button image 33, a startup signal for switching the stoppers 19 and 20 to the action positions is wirelessly transmitted from the operation panel to a control device for the transition travel drive control, and the stoppers 19 and 20 are thereby switched to the action positions.

The conveying traveling body 1 which has been sent by the above-described operation into the transition area in the terminal end of the upstream travel path 16A is automatically stopped in the fixed stop position P1 by the stopper 19 in the action position. Next, as indicated in the flowchart shown in FIG. 4, the preceding confirmation steps S3 and S4 and the performance step S5 are performed, and at this time, on the touch panel of the operation panel, instead of the window W-3 shown in FIG. 5C, a window W-4 (see FIG.

Figure 6A:
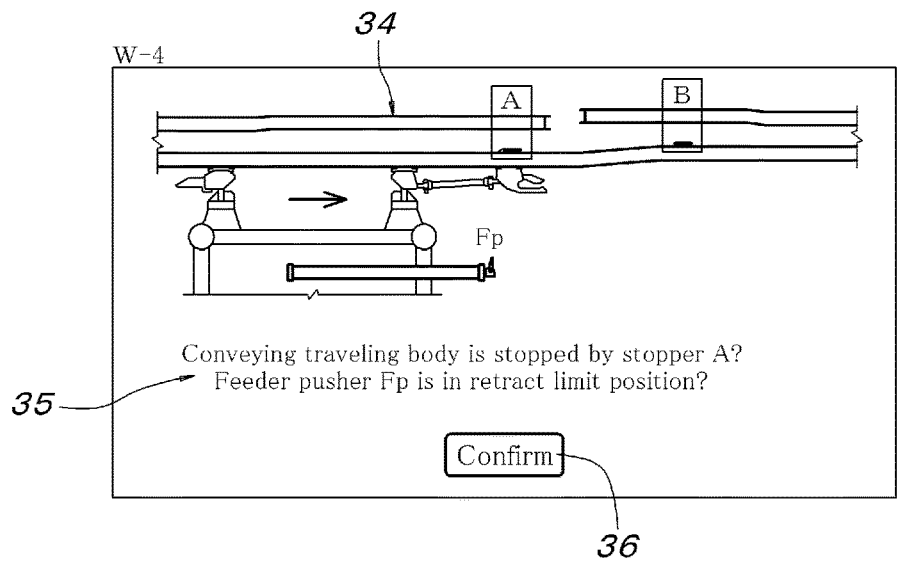
FIGS. 6A to 6C are illustrative diagrams showing a display screen in the second operation stage on the touch panel of the operation panel used in the manual operation.
Figure 6B:
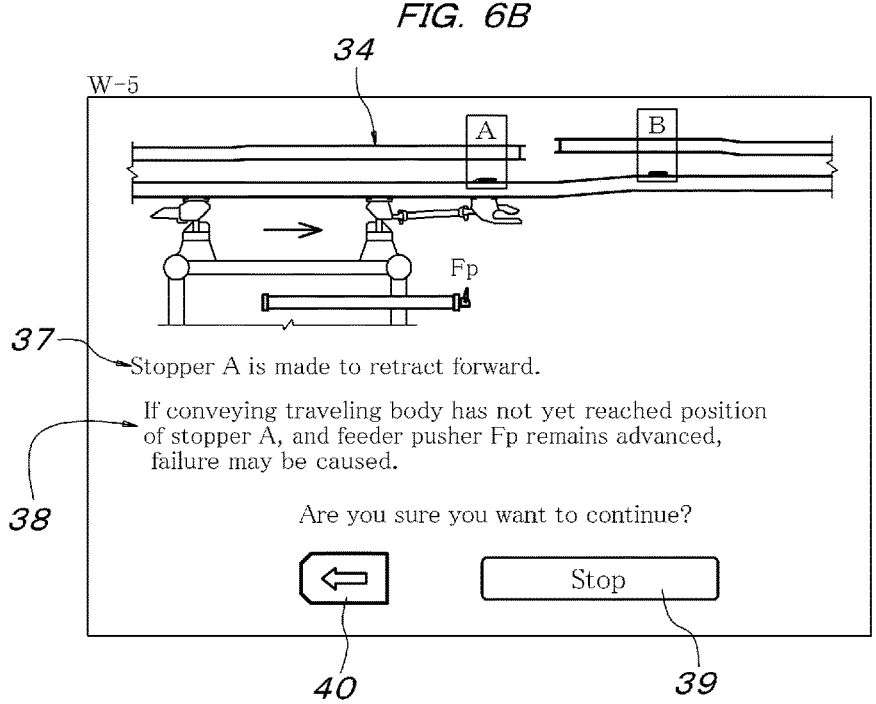

6A) for performing the preceding confirmation steps S3 and S4 is displayed. In the window W-4, a transition area explanatory image 34 including the stoppers A and B corresponding to the stoppers 19 and 20, the conveying traveling body and the feeder, a confirmation item display statement 35, and a confirmation button image 36 are displayed, and the operator visually recognizes, with reference to the transition area explanatory image 34, the details of the preceding confirmation steps S3 and S4, that is, the fact that the conveying traveling body is stopped by the stopper A and that a feeder pusher Fp is in the retract limit position, and then performs the tap operation on the confirmation button image 36. Consequently, on the touch panel of the operation panel, instead of the window W-4, a window W-5 (see FIG. 6B) is displayed.

Figure 6C:
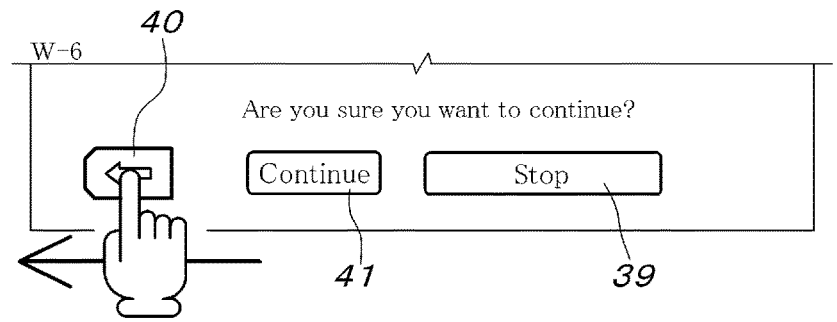

In the window W-5, the transition area explanatory image 34, an operation detail display statement at the time of continuation 37, a warning statement before continuation 38, a stop operation button image 39, and a swipe operation button image before continuation 40 are displayed. Therefore, the operator can confirm the details of the subsequent operation from the operation detail display statement 37, and also confirm cautions from the warning statement before continuation 38, and, if the operator determines from the details of the warning statement before continuation 38 that inconvenience would occur when the operation is performed as it is, the operator can perform the tap operation on the stop operation button image 39, and thereby interrupt the manual operation for the transition travel drive control. When the operator determines that no problem would occur even if the operation is performed as it is, as shown in a window W-6 of FIG. 6C, the swipe operation is performed with a fingertip on the swipe operation button image 40 in an indicated direction. Consequently, since as shown in the same figure, in the position of the swipe operation button image 40 before the swipe operation, a continuation operation button image 41 appears, by performing the tap operation on the continuation operation button image 41, a startup signal for retracting the stopper 19 from the action position and switching to a non-action position is wirelessly transmitted from the operation panel to the control device for the transition travel drive control, and the stopper 19 is thereby switched to the non-action position.

After the performance step S5 is performed, as shown in the flowchart of FIG. 4, the preceding confirmation steps S6 and S7 and the performance step S8, and the preceding confirmation steps S9 and S10 and the performance step S11 are sequentially performed. Although they are not illustrated, when the performance steps S8 and S11 are performed, in the window displayed on the touch panel of the operation panel, as in the windows W-2 and W-3 and the windows W-5 and W-6 displayed on the touch panel of the operation panel when the previous performance steps S2 and S5 are performed, a stop operation button image, a swipe operation button image before continuation, and a continuation operation button image which is displayed only when the swipe operation button image is swiped in a predetermined direction are included.

It is noted that, although the continuation operation button image (33, 41, . . . ) which appears when the swipe operation is performed on the swipe operation button image (32, 40, . . . ) in the predetermined direction is operated such that the intended operation is performed, it is preferable to adopt a configuration in which, when the tap operation is not performed on the continuation button image within a set time after the swipe operation on the swipe operation button image, the swipe operation button image is automatically returned to the original position such that the operation button image is hidden.

Figure 7A:
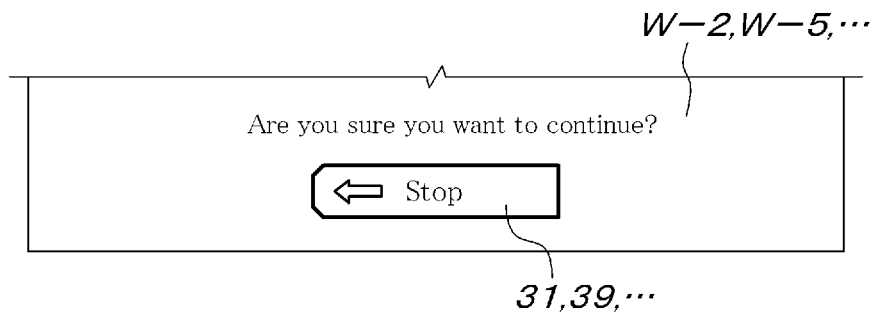
FIGS. 7A to 7D are illustrative diagrams showing another embodiment of the display screen on the touch panel of the operation panel used in the manual operation.
Figure 7B:
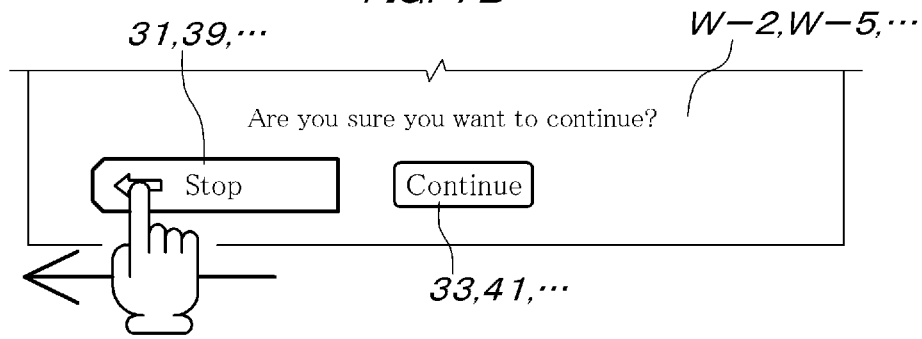
Figure 7C:
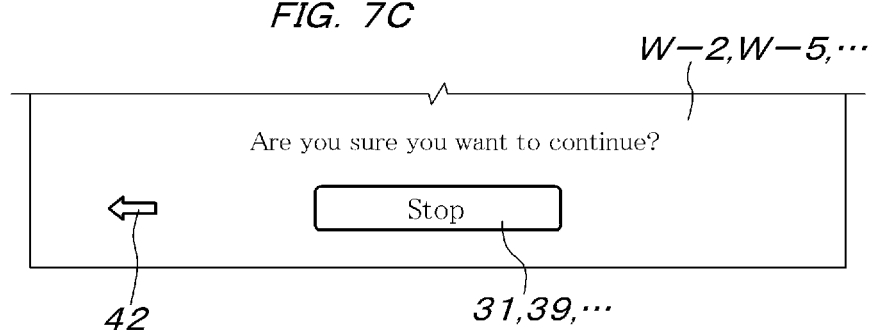
Figure 7D:
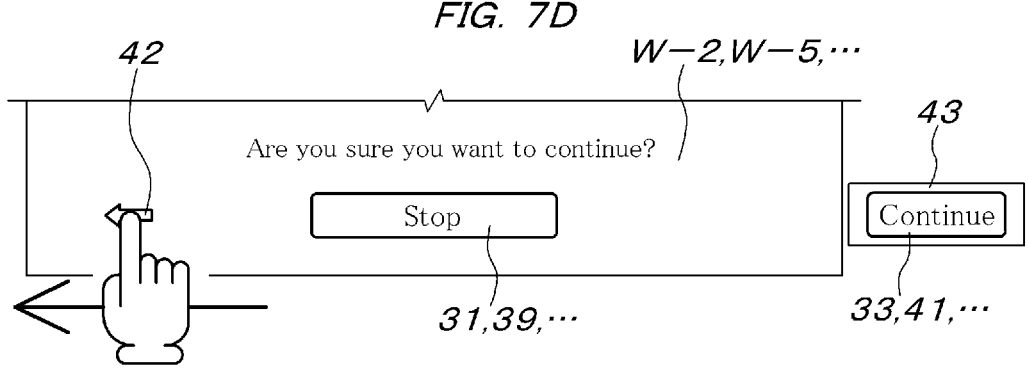

In addition, although the stop operation button image (31, 39, . . . ) which is displayed on the window when each performance step is performed is provided so as to interrupt and ends the transition control of the conveying traveling body 1, as shown in FIGS. 7A and 7B, it is also possible to configure such that the swipe operation can be performed on the stop operation button image (31, 39, . . . ) in the predetermined direction, when the swipe operation is performed on the stop operation button image (31, 39, . . . ) in the predetermined direction, the continuation operation button image (33, 41, . . . ) appears in the position where the stop operation button image (31, 39, . . . ) was present, and thus the stop operation button image (31, 39, . . . ) is also used as the swipe operation button image (32, 40, . . . ). Furthermore, it is also possible to configure such that, as shown in FIGS. 7C and 7D, the window (W-2, W-5, . . . ) itself displayed on the touch panel of the operation panel can be swipe-operated in the direction of a displayed arrow 42 when the performance steps S2, S5, S8, and S11 are performed, and, by performing the swipe operation on the window (W-2, W-5, . . . ), a small window 43 including the continuation operation button image (33, 41, . . . ) which has been hidden by the window appears.

A touch panel for manually operating machinery according to the present invention can be utilized in a case where various types of machinery that are normally automatically operated, in particular, various types of machinery that belong to the field of material handling are manually operated in an emergency.

The invention claimed is:

1. A touch panel of a portable operation panel for manually operating machinery, comprising:
    an operation screen for making the machinery perform a specific operation being provided on the touch panel;
    a stop operation button image being provided on the operation screen, and the performance of the specific operation on the machinery is made to stop by a tap operation on the stop operation button image;
    a swipe operation button image being provided in a first position on the operation screen, the swipe operation button image being movable on the operation screen from the first position to a second position by a swipe operation and the swipe operation button image having a display indicating a predetermined direction; and
    upon the swipe operation on the swipe operation button image in the predetermined direction, the swipe operation button image being moved to and provided in the second position on the operation screen and a continuation operation button image is displayed in the first position from which the swipe operation button image is moved; and
    the machinery is made to perform the specific operation by performing a tap operation on the continuation operation button image displayed after the swipe operation on the swipe operation button image;
    wherein the swipe operation button image also serves as the stop operation button image that stops the specific operation on the machinery when a tap operation is performed on the swipe operation button image without the swipe operation being performed thereon.

2. The touch panel for manually operating machinery according to claim 1, wherein:
the swipe operation button image is formed with a window that is displayed on the operation screen of the touch panel;
a display that displays information to an operator and a display that indicates the predetermined direction of the swipe operation are provided on the window; and
the continuation operation button image is displayed in a small window displayed in the first position from which the window is moved when the window is moved by the swipe operation.

3. The touch panel for manually operating machinery according to claim 1, wherein:
when the tap operation is not performed on the continuation operation button image within a set time after the swipe operation on the swipe operation button image, the swipe operation button image is automatically returned to the first position such that the continuation operation button image is hidden.

* * * * *